United States Patent
Adachi et al.

(10) Patent No.: US 12,337,902 B2
(45) Date of Patent: Jun. 24, 2025

(54) VEHICLE LOWER BODY STRUCTURE

(71) Applicant: MAZDA MOTOR CORPORATION, Hiroshima (JP)

(72) Inventors: Takuya Adachi, Hiroshima (JP); Hirotaka Natsume, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 359 days.

(21) Appl. No.: 18/159,017

(22) Filed: Jan. 24, 2023

(65) Prior Publication Data

US 2023/0257028 A1  Aug. 17, 2023

(30) Foreign Application Priority Data

Feb. 16, 2022 (JP) ................................ 2022-022044

(51) Int. Cl.
*B62D 25/20* (2006.01)
*B60K 1/04* (2019.01)

(52) U.S. Cl.
CPC ............ *B62D 25/2036* (2013.01); *B60K 1/04* (2013.01); *B60K 2001/0438* (2013.01)

(58) Field of Classification Search
CPC .. B62D 25/2036; B62D 25/025; B62D 25/20; B62D 25/00; B62D 25/2009; B62D 25/02; B62D 21/15; B62D 21/157; B62D 21/00; B60K 1/00; B60K 1/04; B60K 2001/0438; B60K 2001/0405

See application file for complete search history.

(56) References Cited

U.S. PATENT DOCUMENTS

| | | | |
|---|---|---|---|
| 8,708,402 B2 * | 4/2014 | Saeki ................... | B62D 21/157 180/68.5 |
| 8,839,895 B2 * | 9/2014 | Kato ................... | H01M 50/242 180/68.5 |
| 10,358,168 B2 * | 7/2019 | Atsumi ................. | B62D 21/15 |
| 10,603,999 B2 * | 3/2020 | Fukui ..................... | B62D 25/20 |
| 10,668,957 B2 * | 6/2020 | Choi .................. | B62D 25/2036 |
| 10,899,389 B2 * | 1/2021 | Kasai ................... | B62D 21/157 |
| 11,007,899 B2 * | 5/2021 | Wang ...................... | B60L 50/64 |
| 11,059,519 B2 * | 7/2021 | Persson ................. | B62D 21/02 |
| 11,208,152 B2 * | 12/2021 | Kawase ............... | B60L 3/0046 |

(Continued)

FOREIGN PATENT DOCUMENTS

JP        2019-127054 A        8/2019

*Primary Examiner* — James M Dolak
(74) *Attorney, Agent, or Firm* — Studebaker Brackett PLLC

(57) ABSTRACT

A vehicle floor frame provides improved ride quality and energy absorption. A wall section opposes a lower surface of a floor panel; an outer wall section extends from an outer end portion of the wall section toward the floor panel; an inner wall section extends from an inner end portion of the wall section toward the floor panel; and a hole and a bead reduce a dimension of the wall section when an impact load is applied from an outer side in a vehicle width direction. A nut plate in a closed cross section of the floor frame includes lateral wall fixed sections respectively fixed to the outer wall section and the inner wall section; an opposing wall fixed section fixed to the wall section; and deformation promoting sections configured to reduce a dimension in the vehicle width direction of the nut plate when the impact load is applied.

12 Claims, 11 Drawing Sheets

(56) References Cited

U.S. PATENT DOCUMENTS 11,820,219 B2 * 11/2023 Ostertag ................ B62D 25/20
11,993,313 B2 *  5/2024 Natsume .............. B62D 25/025
12,049,255 B2 *  7/2024 Katayama ................ B60K 1/04
12,151,742 B2 * 11/2024 Tatsuwaki .............. B62D 25/20

* cited by examiner

FIG. 9
BEFORE COLLISION
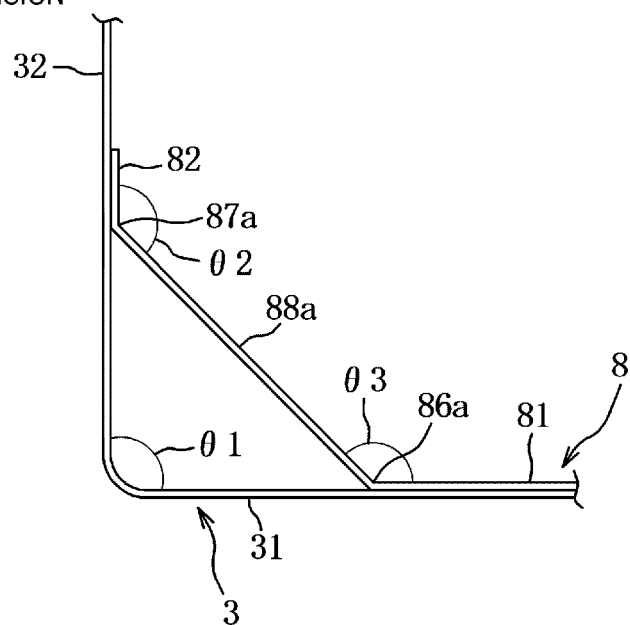
AFTER COLLISION
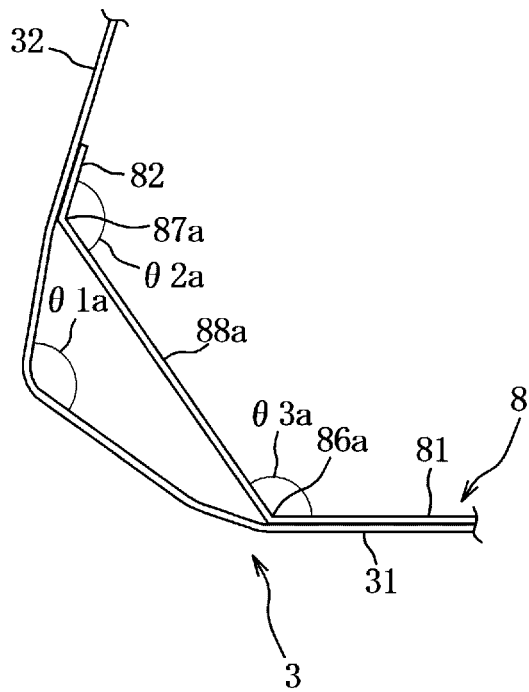

VEHICLE LOWER BODY STRUCTURE

TECHNICAL FIELD

The present disclosure relates to a vehicle lower body structure and particularly relates to a vehicle lower body structure that is arranged on an inner side in a vehicle width direction of a floor frame and includes a battery unit overlapping the floor frame in an up-down direction in a side view.

BACKGROUND

Conventionally, electric vehicles such as a hybrid car and an electric car have a high-capacity battery that serves as a power source of an electric motor (for example, a motor generator or a motor) for driving wheels. Usually, an in-vehicle battery unit is configured to include plural battery modules, each of which is constructed of an assembly of battery cells such as lithium-ion batteries; a battery case that is made of metal or a synthetic resin and accommodates these plural battery modules; and the like. This battery unit is arranged by using a space under a floor panel and is attached to a vehicle body via an attachment bracket. The space partially overlaps a floor frame in an up-down direction.

Various techniques have been proposed to protect the battery unit against a lateral collision of the vehicle by using a vehicle body strength member to absorb an impact load applied from an outer side in a vehicle width direction during the lateral collision of the vehicle. A vehicle lower structure disclosed in Japanese Patent Document JP-A-2019-127054 includes a floor panel that constitutes a floor surface section of the vehicle; a pair of rockers (side sills) that is provided in both of end portions of this floor panel in the vehicle width direction and extends in a vehicle body front-rear direction; a floor crossmember that extends in the vehicle width direction and connects the pair of rockers in a cooperative manner with the floor panel; and the battery unit that is arranged in a space located under the floor panel and between the pair of rockers. In the floor crossmember, a floor crossmember low-strength portion is formed in a joint portion with the rocker on the outer side in the vehicle width direction.

SUMMARY

While being able to protect the battery unit against the impact load during the lateral collision of the vehicle, the vehicle lower structure disclosed in JP-A-2019-127054 may not be able to improve ride quality of an occupant during steady travel.

As illustrated in FIG. 11, in the case where a battery unit 106 is constructed of a right and left pair of split battery units 161 that is arranged on right and left sides of a tunnel section while holding the tunnel section therebetween, an outer end portion in the vehicle width direction of each of the split battery units 161 is bolted to a bottom wall section 131 (an opposing wall section) of a floor frame 103, which is joined to a lower surface of the floor panel, via an attachment bracket 107, and an inner end portion in the vehicle width direction of each of the split battery units 161 is bolted to a lower portion of the tunnel section via an attachment bracket (not illustrated).

FIG. 12 illustrates a result of a strain analysis during steady travel by simulation. During steady travel of the vehicle, vibration energy that is generated by the wheel and a road surface is transmitted to the split battery unit 161 via a suspension member, and the split battery unit 161 then resonates with the floor frame 103, resulting in low-frequency vertical behavior. Since the vertical behavior of the split battery unit 161 is vertical oscillating motion with the floor frame 103, to which the outer end portion in the vehicle width direction of the split battery unit 161 is fastened, being a fulcrum, as illustrated in FIG. 12, a load is concentrated on a bent section 103a, which constitutes a ridgeline of a corner section extending in the front-rear direction in the floor frame 103, and strain energy indicated by shading is accumulated. This induces misshaping of a cross section of the floor frame 103, resulting in the degraded ride quality of the occupant.

In order to avoid misshaping of the cross section of the floor frame 103 and thereby improve the ride quality, a reinforcing member can be provided (for example, a joint member or the like), which prevents misshaping of the cross section, in a closed cross section of the floor frame 103. In the case where the reinforcing member for preventing misshaping of the cross section is provided, rigidity of the floor frame 103 is improved overall, and thus the degraded ride quality is improved. However, the floor frame 103 itself is prevented from being squashed inversely with the improvement in the ride quality. Thus, energy absorption (EA) performance (i.e., absorption of the impact load during a lateral collision) is degraded. As a result, the battery unit 106 may not be sufficiently protected against the impact load. That is, it is not easy to simultaneously achieve ride quality performance during steady travel and EA performance during a lateral collision in the vehicle on which the battery unit is mounted.

The present disclosure has a purpose of providing a vehicle lower body structure and the like capable of simultaneously achieving ride quality performance of an occupant and EA performance.

A vehicle lower body structure according to a first aspect includes a floor panel that constitutes a floor surface section of the vehicle; a side sill that is coupled to an end portion in a vehicle width direction of this floor panel and extends in a vehicle body front-rear direction; a floor frame that cooperates with the floor panel to form a closed cross section extending in the vehicle body front-rear direction and is adjacent to an inner side in the vehicle width direction of the side sill; and a battery unit that is arranged on an inner side in the vehicle width direction of this floor frame and overlaps the floor frame in an up-down direction in a side view. In the vehicle lower body structure, the floor frame has an opposing wall section that opposes a lower surface of the floor panel; an outer wall section that extends from an outer end portion in the vehicle width direction of the opposing wall section toward the floor panel; an inner wall section that extends from an inner end portion in the vehicle width direction of the opposing wall section toward the floor panel; a fastening section that is formed in the opposing wall section and to which the battery unit is fastened; a fragile section configured to reduce a dimension in the vehicle width direction of the opposing wall section via compressive deformation of the opposing wall section when an impact load is applied from an outer side in the vehicle width direction; and a reinforcing member that is provided in the closed cross section and reinforces the fastening section, and the reinforcing member includes a lateral wall fixed section that is fixed to the outer wall section and the inner wall section; an opposing wall fixed section that is fixed to the opposing wall section; and a deformation promoting section configured to reduce a dimension in the vehicle width direction of the reinforcing member via compressive deformation of a portion between the lateral wall fixed section and the opposing wall fixed section when the impact load is applied from the outer side in the vehicle width direction.

In this vehicle lower body structure, the floor frame has the opposing wall section that opposes the lower surface of the floor panel; the outer wall section that extends from the outer end portion in the vehicle width direction of the opposing wall section toward the floor panel; the inner wall section that extends from the inner end portion in the vehicle width direction of the opposing wall section toward the floor panel; the fastening section that is formed in the opposing wall section and to which the battery unit is fastened; the fragile section configured to reduce the dimension in the vehicle width direction of the opposing wall section via the compressive deformation of the opposing wall section when the impact load is applied from the outer side in the vehicle width direction; and the reinforcing member that is provided in the closed cross section and reinforces the fastening section. Therefore, it is possible to reduce rigidity of the opposing wall section in accordance with a request while preventing misshaping of the cross section of the floor frame. The reinforcing member includes the lateral wall fixed section that is fixed to the outer wall section and the inner wall section; the opposing wall fixed section that is fixed to the opposing wall section; and the deformation promoting section configured to reduce the dimension in the vehicle width direction of the reinforcing member via the compressive deformation of the portion between the lateral wall fixed section and the opposing wall fixed section when the impact load is applied from the outer side in the vehicle width direction. Therefore, it is possible to orient the deformation of the opposing wall section toward the vehicle width direction by the deformation promoting section while maintaining rigidity in an up-down direction of the floor frame, and it is possible to promote deformation toward the vehicle width direction.

According to a second aspect of the disclosure, in the disclosure according to the first aspect, in an intermediate portion in the vehicle width direction of the vehicle, the floor panel is formed with a tunnel section that is projected upward and extends in the vehicle body front-rear direction, and the battery unit is constructed of a pair of split battery units that is arranged on both sides in the vehicle width direction of the tunnel section. With this configuration, it is possible to simultaneously achieve ride quality performance of an occupant and EA performance in the vehicle that includes the tunnel section and in which vertical behavior of the battery unit is significant.

According to a third aspect of the disclosure, in the disclosure according to the first aspect or the second aspect, the deformation promoting section has a bent section that is formed in the reinforcing member and extends in the vehicle body front-rear direction. With this configuration, it is possible to form the deformation promoting section, which restricts a deformation direction of the opposing wall section, with a simple configuration.

According to a fourth aspect of the disclosure, in the disclosure according to the third aspect, the deformation promoting section cooperates with a corner section of the floor frame to form a space section having a substantially triangular cross section. With this configuration, it is possible to suppress misshaping of the cross section of the floor frame during steady travel and to secure the EA performance of the floor frame during a lateral collision with an intentional space structure formed in the floor frame.

According to a fifth aspect of the disclosure, in the disclosure according to any one of the first aspect to the fourth aspect, at least two of the fastening sections are provided to be separated from each other in the vehicle body front-rear direction in a manner to correspond to the reinforcing members. With this configuration, it is possible to enhance an effect of simultaneously achieving the ride quality performance of the occupant and the EA performance by the at least two fastening sections.

According to a sixth aspect of the disclosure, in the disclosure according to the fifth aspect, a seat attachment section for a seat on which the occupant is seated is installed between the front reinforcing member and the rear reinforcing member in the vehicle body front-rear direction of the reinforcing members. With this configuration, it is possible to improve the ride quality performance of the occupant even with a seat attachment structure that is easily affected by the vertical behavior of the battery unit.

According to a seventh aspect of the disclosure, in the disclosure according to any one of the first aspect to the sixth aspect, a lower end portion of the side sill is formed to be lower than the opposing wall section, the battery unit is fastened to the fastening section via an attachment bracket, and a clearance that allows deformation of the deformation promoting section is provided between an inner end portion in the vehicle width direction of the side sill and an outer end portion in the vehicle width direction of the attachment bracket. With this configuration, even in the case where the battery unit is fastened to the fastening section of the opposing wall section via the attachment bracket, it is possible to avoid the deformation of the opposing wall section from being inhibited by the attachment bracket and thus to reliably and simultaneously achieve the ride quality performance and the EA performance.

According to the vehicle lower body structure in the present disclosure, it is possible to simultaneously achieve the ride quality performance and the EA performance by using the fragile section for orienting the deformation and the deformation promoting section for promoting the deformation.

BRIEF DESCRIPTION OF THE DRAWINGS

FIG. 9 is an explanatory view of deformation behavior of a floor frame.

DETAILED DESCRIPTION

A description will hereinafter be made of a mode for carrying out the present disclosure with reference to the drawings. The following description of a preferred embodiment is essentially and merely illustrative and thus has no intention to limit the present disclosure, application subjects thereof, and application thereof.

First Embodiment

A description will hereinafter be made of a first embodiment of the present disclosure with reference to FIG. 1 to FIG. 10. A vehicle according to this first embodiment is a plug-in hybrid vehicle (PHEV) that includes an internal combustion engine (not illustrated), such as a gasoline engine or a diesel engine, and an electric motor (a motor generator) (not illustrated) for driving the vehicle.

Figure 1:
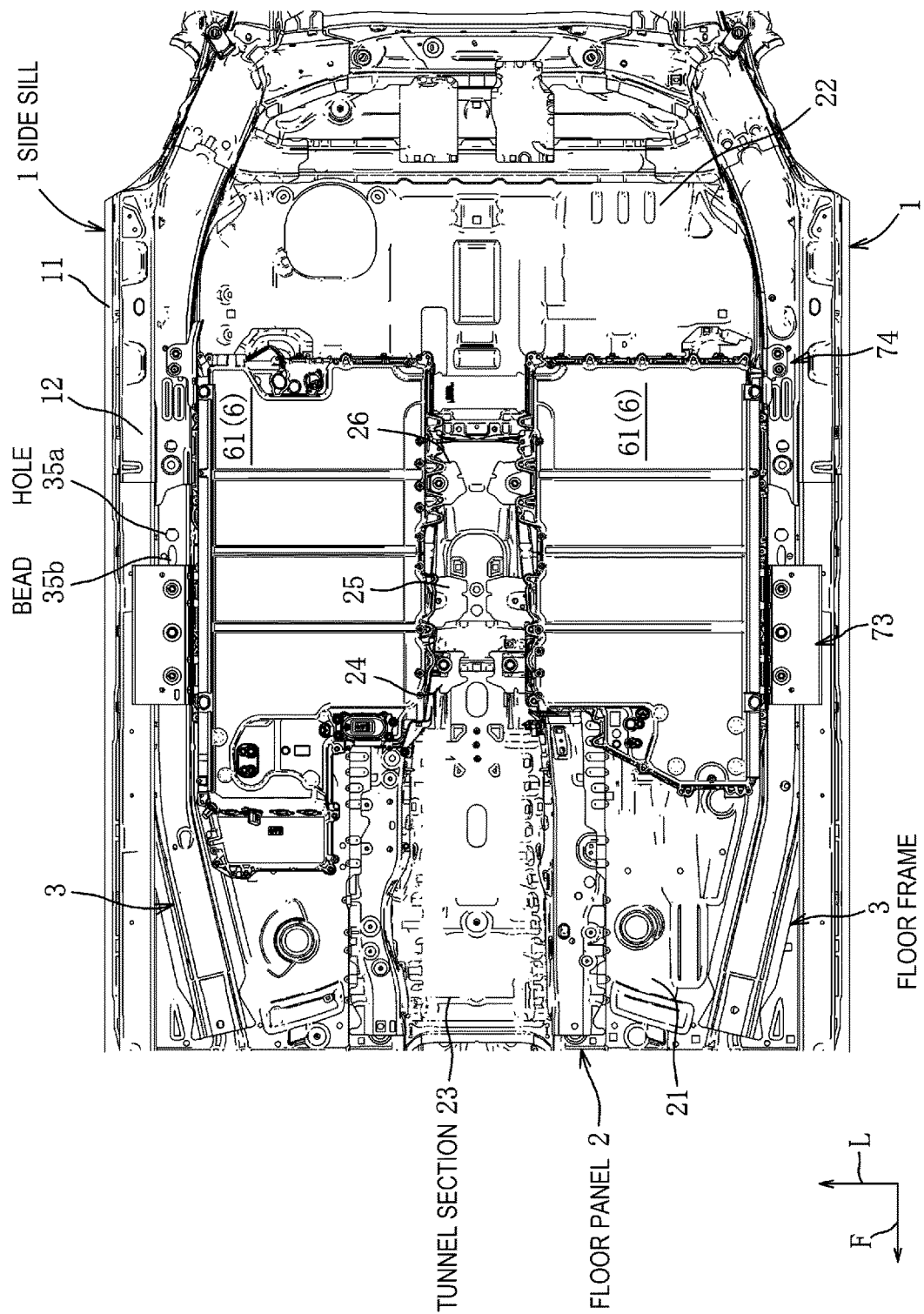
FIG. 1 is a bottom view of a vehicle lower body structure according to a first embodiment.
Figure 2:
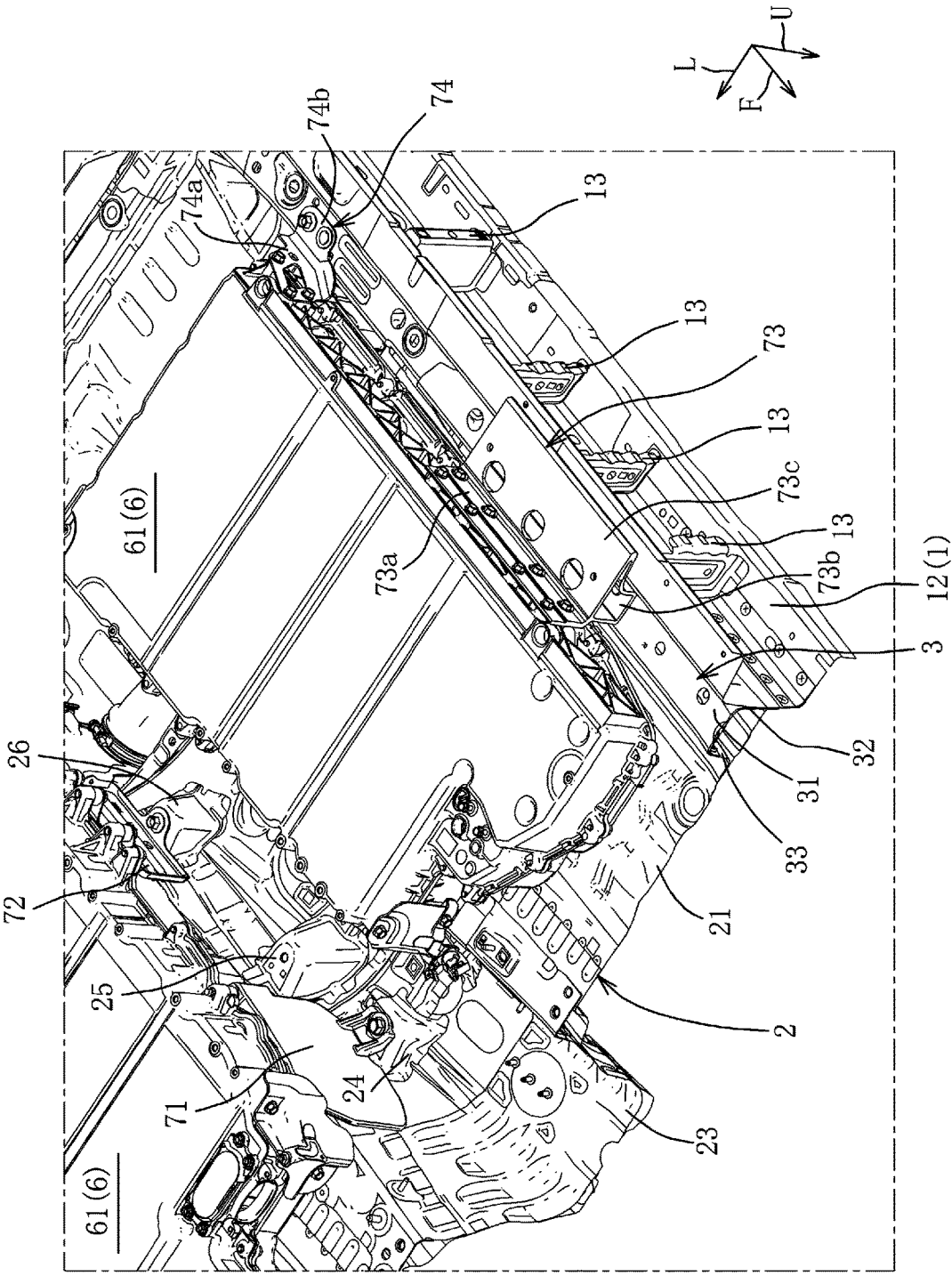
FIG. 2 is a perspective view of main sections in FIG. 1.
Figure 3:
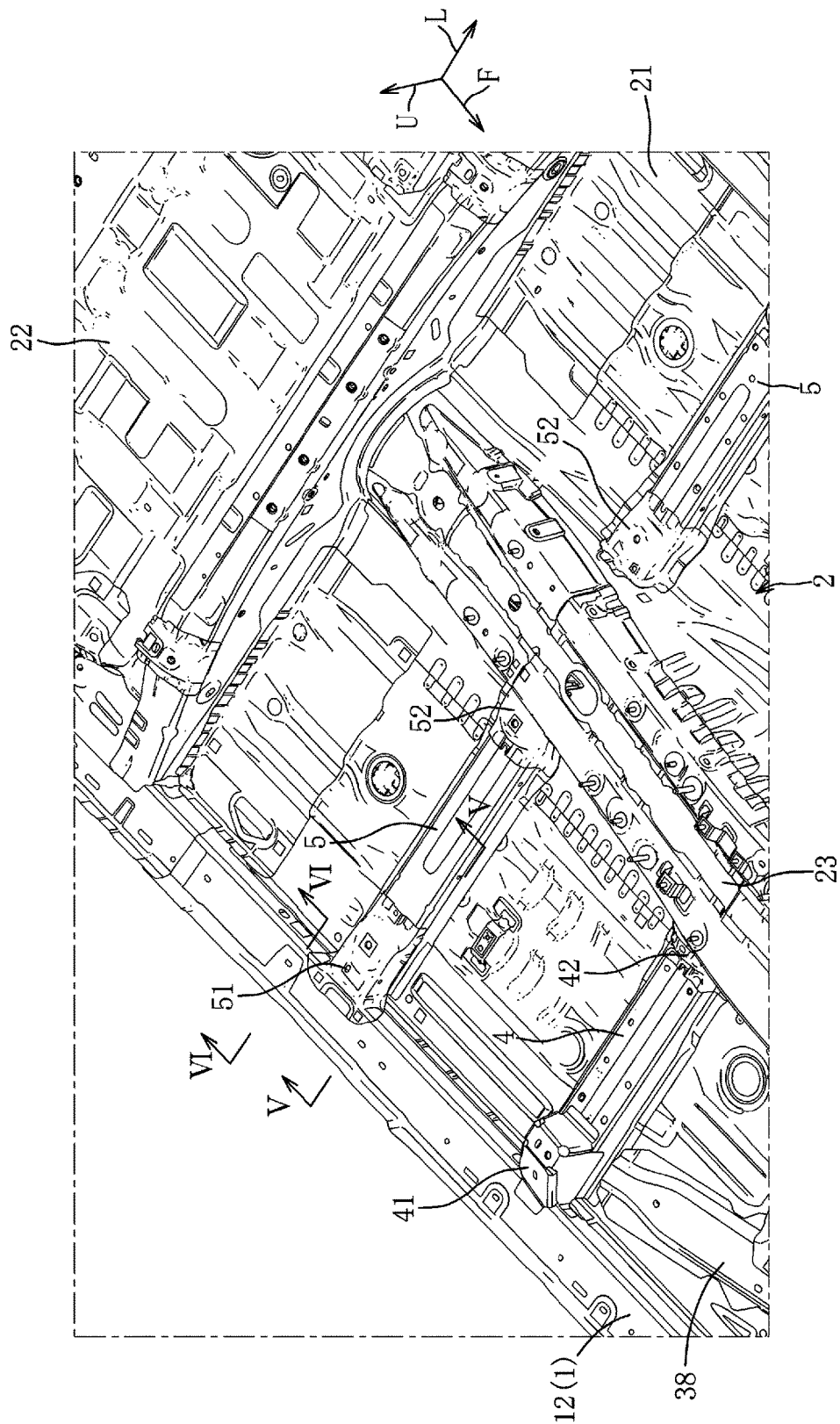
FIG. 3 is a perspective view in which the lower body structure is seen from a cabin side.

As illustrated in FIG. 1 to FIG. 3, the vehicle includes: a right and left pair of side sills 1, each of which extends in a front-rear direction; a floor panel 2 that constitutes a floor surface section of the vehicle; a right and left pair of floor frames 3, each of which extends in the front-rear direction; plural crossmembers 4, 5, each of which extends in a right-left direction; a battery unit 6; and the like. Hereinafter, a description will be made by setting an arrow F direction as forward in a vehicle body front-rear direction, an arrow L direction as leftward in a vehicle width direction, and an arrow U direction as upward in a vehicle body up-down direction in the drawings. This vehicle has a substantially bilaterally-symmetrical structure.

First, a description will be made of the pair of side sills 1. The side sill 1 includes: an outer panel 11 that constitutes an outer wall section in the vehicle width direction and has a substantially hat-shaped cross section; and an inner panel 12 that constitutes an inner wall section in the vehicle width direction and has a substantially hat-shaped cross section. Both of the panels 11, 12 cooperate to form a closed cross section that extends in the front-rear direction and has a substantially rectangular shape. The inner panel 12 is a press-molded product that is made of a steel sheet, and has a plate thickness of 1.6 mm and tensile strength of 1180 MPa, for example. As illustrated in FIG. 2 and FIG. 4 to FIG. 6, in an intermediate portion of the inner panel 12, plural joints 13 are provided at predetermined intervals to partially divide the closed cross section of the side sill 1 in the front-rear direction.

A hinge pillar (not illustrated) that extends in an up-down direction is coupled to a front end portion of each of the paired side sills 1. A rear pillar (not illustrated) that extends in the up-down direction is coupled to a rear end portion of each of the paired side sills 1. A dashboard (not illustrated) is vertically provided between a pair of the hinge pillars in a manner to separate an engine compartment, on which the engine is mounted, and a cabin interior space from each other in the front-rear direction.

Next, a description will be made of the floor panel 2. The floor panel 2 is formed to be hung between the pair of the side sills 1. This floor panel 2 has a plate thickness of 0.8 mm and tensile strength of 590 MPa, for example. As illustrated in FIG. 1 to FIG. 3, the floor panel 2 includes: a front panel 21 on which a front-seat occupant seat (not illustrated) is mounted; a rear panel 22 on which a rear-seat occupant seat (not illustrated) is mounted and that continues rearward from a rear end of this front panel 21 via a kick-up section that stands upward in a rearward and upward inclined manner; and a tunnel section 23 that bulges upward (inward in the cabin) and extends in the front-rear direction in a central portion in the vehicle width direction.

The tunnel section 23 accommodates, in a lower space corresponding to inside thereof, an exhaust pipe of the engine, a propeller shaft, each of which extends in the front-rear direction, and the like (none of these components are not illustrated). Under a top of an intermediate portion in the front-rear direction of the tunnel section 23, three fixed sections 24 to 26, each of which is provided as a right and left pair, are sequentially provided from the front to the rear. Each of the fixed sections 24 to 26 is formed in a shape of a partial square column and is provided to be projected downward from respective one of both end portions in the vehicle width direction of the top of the tunnel section 23. The fixed sections 24, 26 are attachment seats for fixing an inner portion in the vehicle width direction of a split battery unit 61 (the battery unit 6), which will be described below, and the fixed section 25 is an attachment seat for fixing the exhaust pipe and the propeller shaft. A projection amount of the fixed section 24 is set to a small value while projection amounts of the fixed sections 25, 26 are set to larger values than the projection amount of the fixed section 24.

Figure 4:
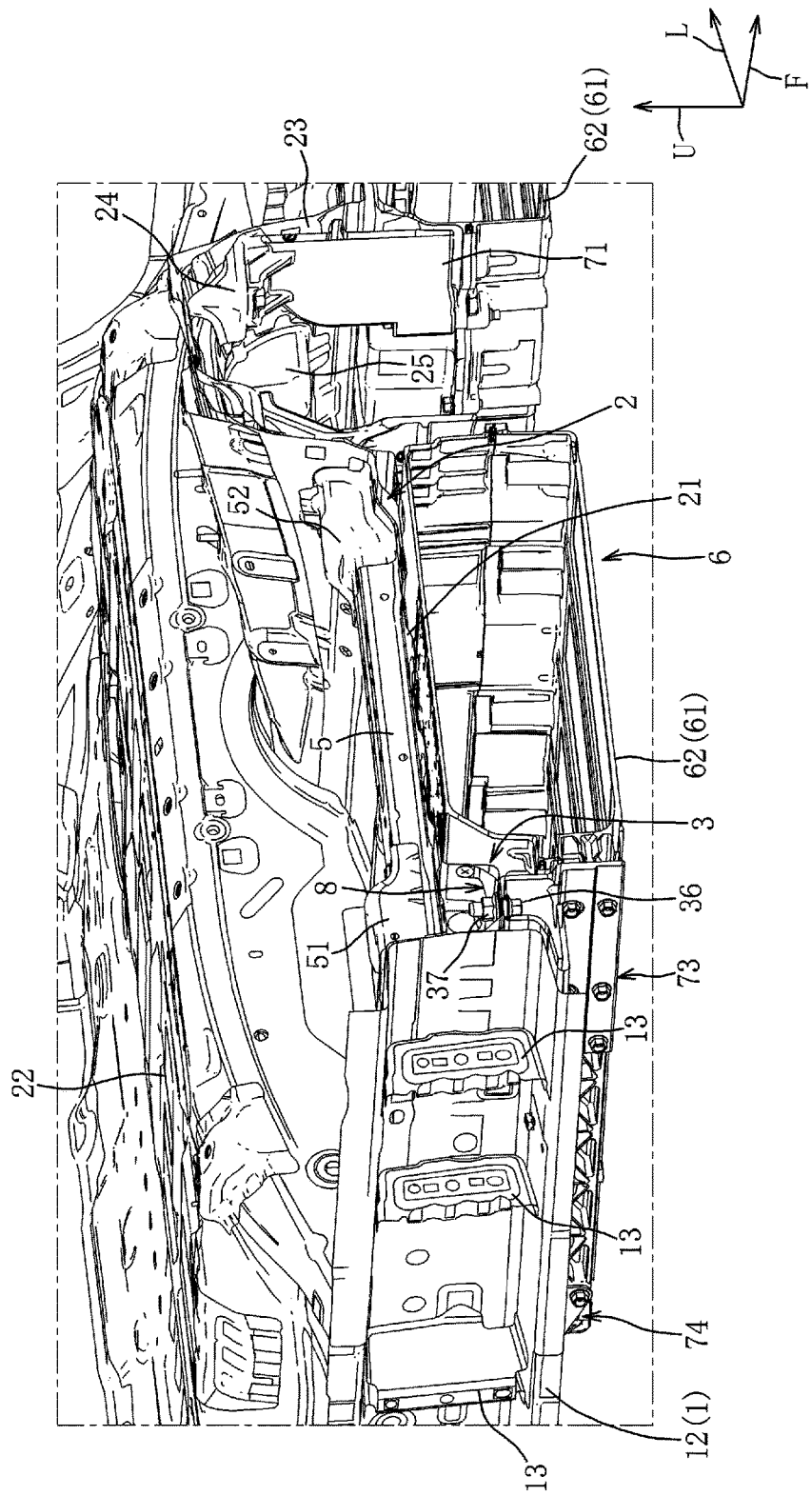
FIG. 4 is a vertical cross-sectional view of the main sections of the lower body structure.
Figure 5:
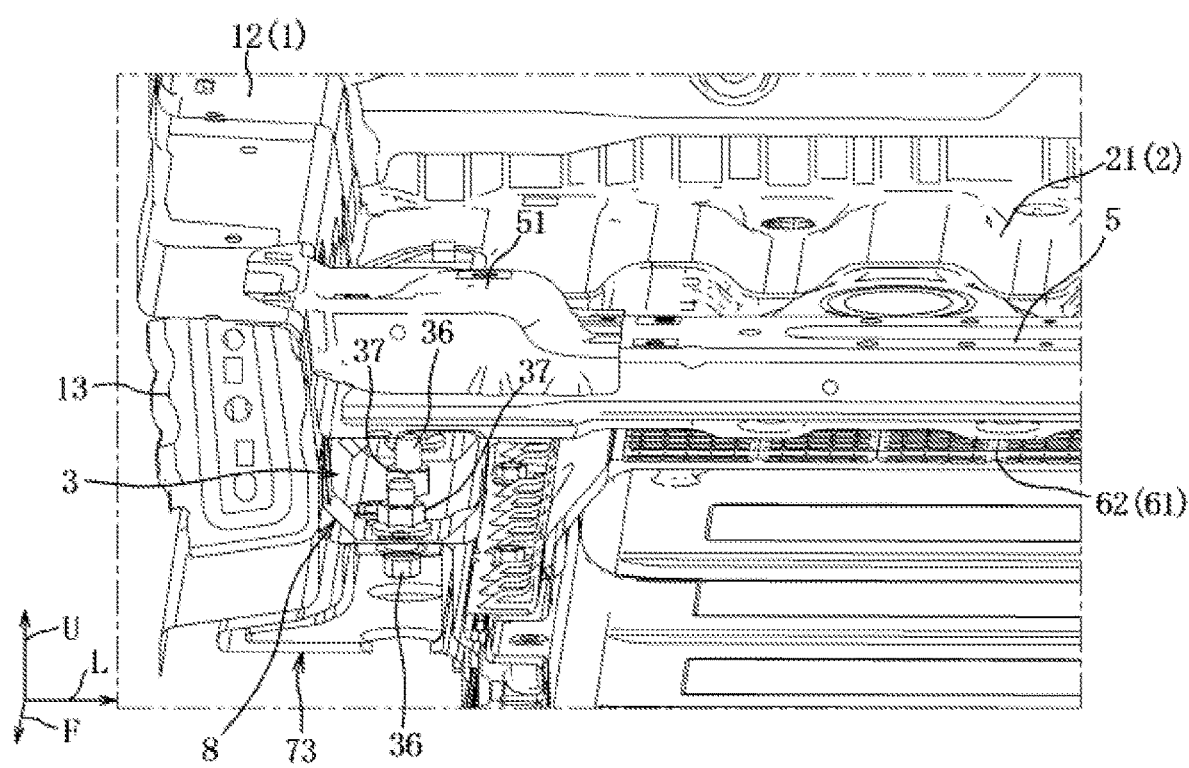
FIG. 5 is a cross-sectional view that is taken along line V-V in FIG. 3.
Figure 6:
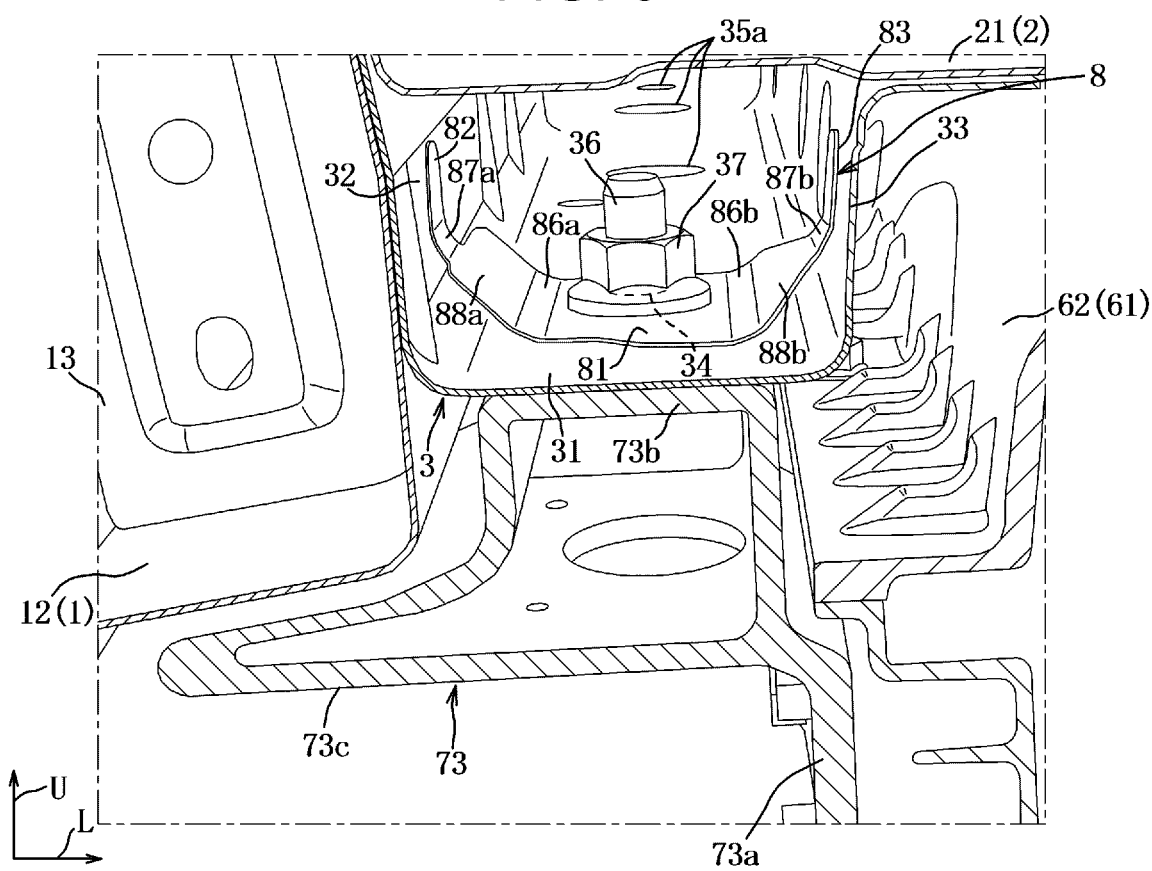
FIG. 6 is a cross-sectional view that is taken along line VI-VI in FIG. 3.

Next, a description will be made of the pair of floor frames 3. The pair of floor frames 3 is configured that a distance between front portions thereof in the vehicle width direction is reduced toward the front, and rear portions thereof are respectively adjacent to and in parallel with the paired side sills 1. As illustrated in FIG. 4 to FIG. 6, the floor frame 3 is configured to have a substantially U-shaped cross section and cooperates with a lower surface of the floor panel 2 to form a closed cross section that extends in the front-rear direction.

The floor frame 3 includes: an opposing wall section 31 that opposes the lower surface of the front panel 21; an outer wall section 32 that extends upward from an outer end portion in the vehicle width direction of this opposing wall section 31; and an inner wall section 33 that extends upward from an inner end portion in the vehicle width direction of the opposing wall section 31. The floor frame 3 is a press-molded product that is made of steel sheet, and has a plate thickness of 1.4 mm and tensile strength of 780 MPa, for example. The outer wall section 32 is joined to a vertical wall section of the inner panel 12, and an upper end portion of the outer wall section 32 is held between the inner panel 12 and the floor panel 2 and is joined triply with the inner panel 12 and the floor panel 2 by welding. An upper portion of the inner wall section 33 has a flange that is bent inward in the vehicle width direction. This flange is joined to the lower surface of the floor panel 2.

As illustrated in FIG. 1 and FIG. 6 to FIG. 8, the opposing wall section 31 is provided with: three bolt holes 34 (fastening sections) that are aligned in the front-rear direction; one or plural holes 35a; one or plural beads 35b; three bolts 36, each of which is inserted through the respective bolt hole 34; three nuts 37, each of which is fastened to the respective bolt 36; and the like. The bolt holes 34 each include a surrounding area where the bolt 36 can be fastened. The opposing wall section 31 is formed at a higher height position than a bottom section of the inner panel 12. In this way, the vertical wall section of the inner panel 12 can be supported from the inner side in the vehicle width direction by a bent section (a ridgeline) that is formed by the opposing wall section 31 and the outer wall section 32, and inward falling of the side sill 1 (the inner panel 12) is thereby avoided.

In a plan view, the front bolt hole 34 is formed at a position in front of the 2.5 crossmember 5, and the rear bolt hole 34 is formed at a position behind the 2.5 crossmember 5. The intermediate bolt hole 34 is arranged at a position under the 2.5 crossmember 5 and is covered with the 2.5 crossmember 5 from above. A nut plate 8 as a reinforcing member is arranged to each of the front bolt hole 34 and the rear bolt hole 34 while the nut plate 8 is not arranged to the intermediate bolt hole 34 (see FIG. 5).

Figure 8:
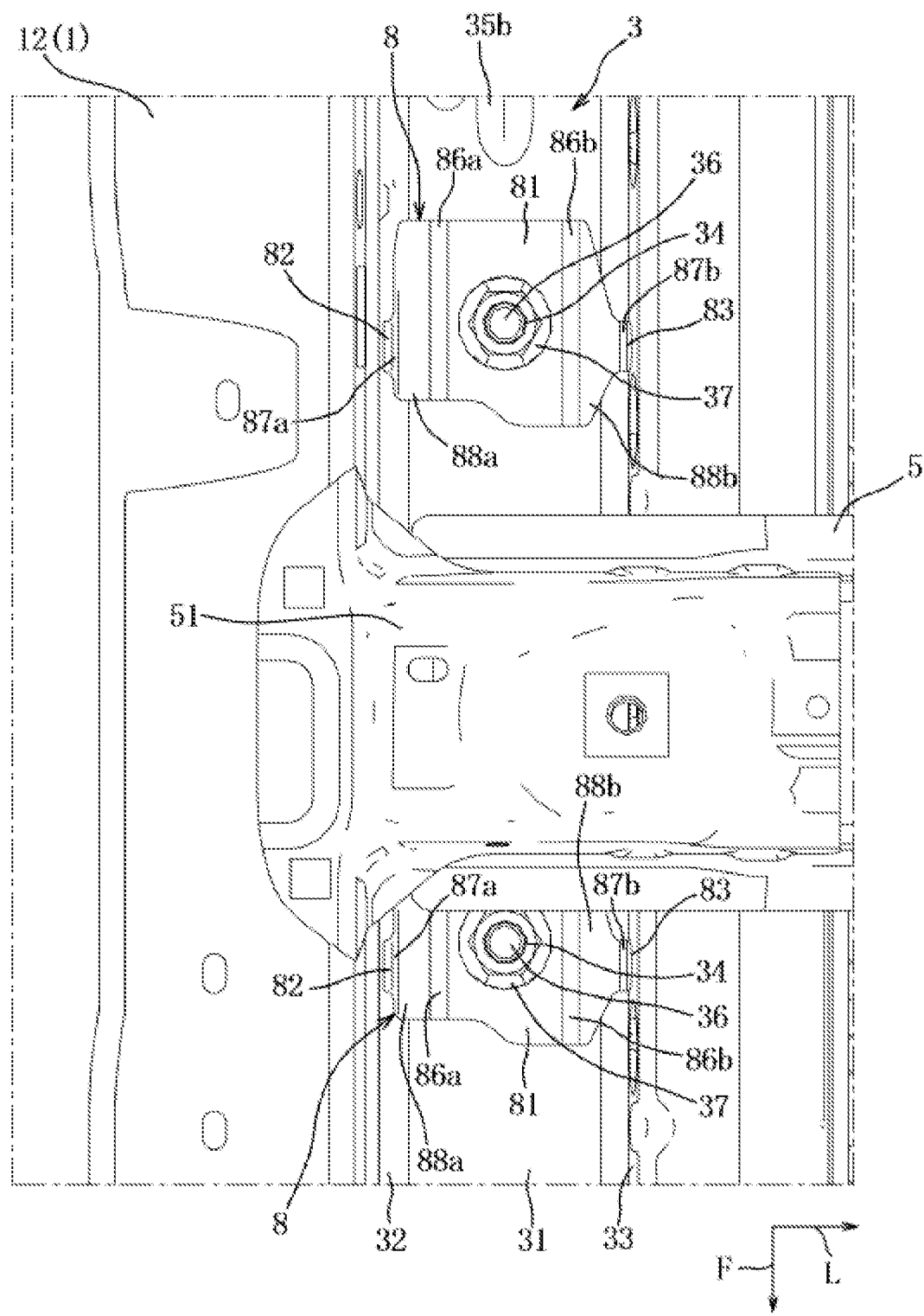
FIG. 8 is a plan view of main sections in FIG. 7.

As illustrated in FIG. 6, the plural holes 35*a* are formed at positions behind the rear bolt 36 (the rear bolt hole 34). The plural holes 35*a* are configured to communicate between the inside and the outside of the closed cross section that is cooperatively formed by the floor panel 2 and the floor frame 3. As illustrated in FIG. 1 and FIG. 8, the bead 35*b* extends in the front-rear direction and is formed in front of the hole 35*a* that is formed behind the rear bolt 36 and at the foremost position of the holes 35*a*. The bead 35*b* is configured to be projected into the closed cross section.

In this embodiment, the bead 35*b* is arranged in front of the hole 35*a*. However, the hole 35*a* may be arranged in front of the bead 35*b*. These hole 35*a* and bead 35*b* reduce rigidity of the opposing wall section 31 of the floor frame 3 and thus constitute a fragile section in which a dimension of the opposing wall section 31 in the vehicle width direction is reduced when an impact load is applied from a lateral side.

Figure 7:
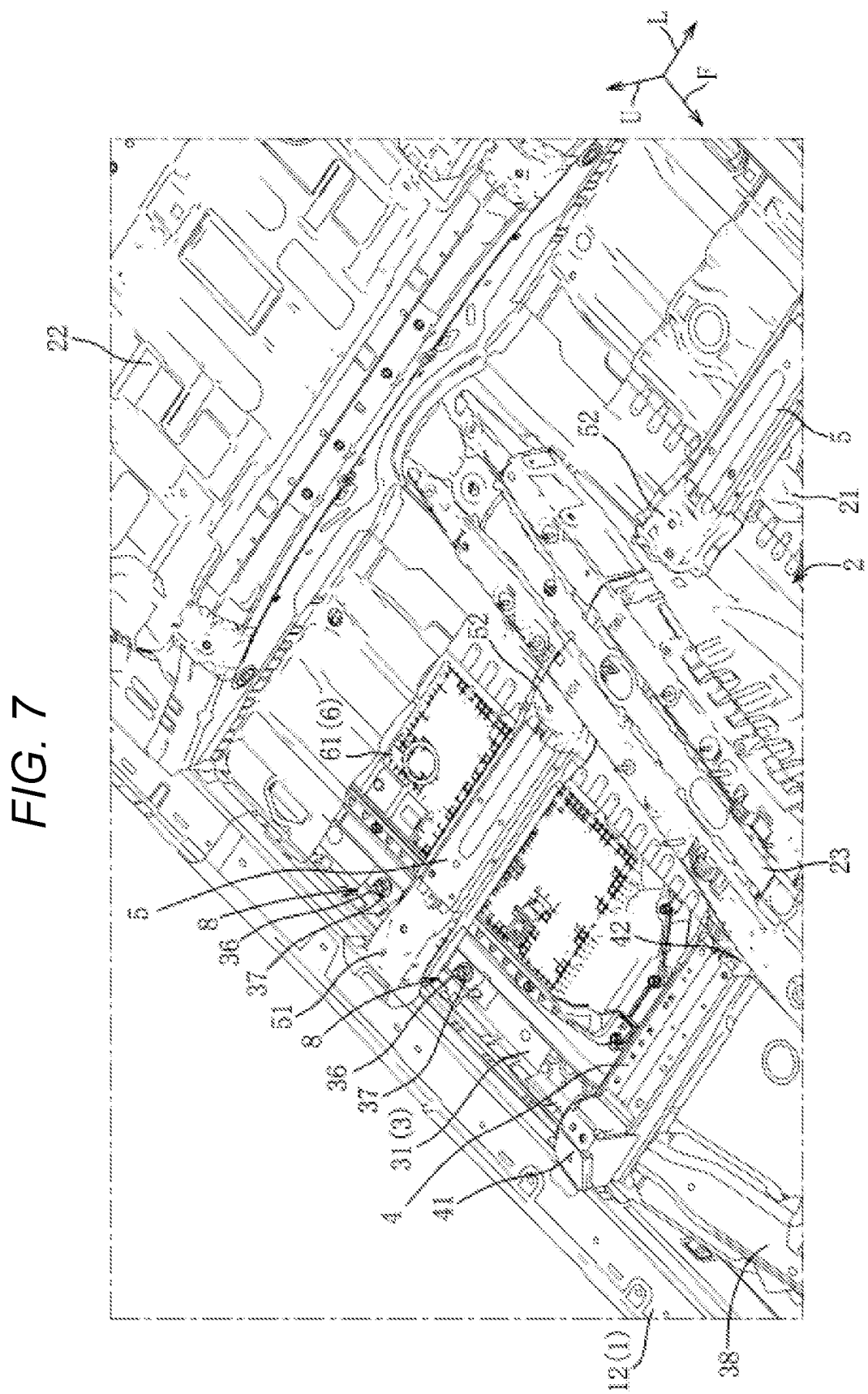
FIG. 7 is a view in which a front floor panel in FIG. 3 is partially unillustrated.

As illustrated in FIG. 3 and FIG. 7, a pair of upper frames 38 is provided in a manner to respectively correspond to the front portions (inclined portions) of the floor frames 3, the distance in the vehicle width direction between which is reduced toward the front. Each of the paired upper frames 38 is formed to have a substantially hat-shaped cross section that is opened downward, and is arranged to oppose the front portion of respective one of the paired floor frames 3 with the front panel 21 being held therebetween. Each of these paired upper frames 38 cooperates with the front panel 21 to form a closed cross section that extends in the front-rear direction.

Next, a description will be made of the 2 crossmember 4 and the 2.5 crossmember 5.

A right and left pair of the 2 crossmembers 4 extends in the vehicle width direction from vertical wall sections on right and left sides of the tunnel section 23 toward the right and left inner panels 12, respectively. Each of the 2 crossmembers 4 is arranged in a manner to correspond to a rear end of the inclined portion of the floor frame 3. This 2 crossmember 4 has a substantially hat-shaped cross section that is opened downward, and cooperates with the front panel 21 to form a closed cross section that extends in the right-left direction.

As illustrated in FIG. 3 and FIG. 7, a pair of seat attachment sections 41, 42 is respectively installed in an outer end portion and an inner end portion in the vehicle width direction of the 2 crossmember 4. The outer seat attachment section 41 is joined to the outer end portion in the vehicle width direction of the 2 crossmember 4 and an upper-half portion of the inner panel 12 and supports a front portion of an outer seat rail (not illustrated) for the front-seat occupant seat. The inner seat attachment section 42 is joined to the inner end portion in the vehicle width direction of the 2 crossmember 4 and the vertical wall section of the tunnel section 23 and supports a front portion of an inner seat rail (not illustrated) for the front-seat occupant seat.

A right and left pair of the 2.5 crossmembers 5 extends in the vehicle width direction from the vertical wall sections on the right and left sides of the tunnel section 23 toward the right and left inner panels 12, respectively. As illustrated in FIG. 8, the 2.5 crossmember 5 is arranged in a manner to correspond to an intermediate portion of a parallel-shaped rear portion of the floor frame 3. More specifically, in the plan view, the 2.5 crossmember 5 is arranged at a position between the front nut plate 8 and the rear nut plate 8, in other words, a position corresponding to the intermediate bolt hole 34. This 2.5 crossmember 5 is formed to have a substantially hat-shaped cross section that is opened downward, and cooperates with the front panel 21 to form a closed cross section that extends in the right-left direction.

As illustrated in FIG. 3 to FIG. 5, FIG. 7, and FIG. 8, a pair of seat attachment sections 51, 52 is respectively installed in an outer end portion and an inner end portion in the vehicle width direction of the 2.5 crossmember 5. The outer seat attachment section 51 is joined to the outer end portion in the vehicle width direction of the 2.5 crossmember 5 and the upper-half portion of the inner panel 12 and supports a rear portion of the outer seat rail for the front-seat occupant seat. The inner seat attachment section 52 is joined to the inner end portion in the vehicle width direction of the 2.5 crossmember 5 and the vertical wall section of the tunnel section 23 and supports a rear portion of the inner seat rail for the front-seat occupant seat.

Next, a description will be made of the battery unit 6. The battery unit 6 accommodates a high-voltage battery in which plural battery modules (not illustrated) are connected in series. In such a state, the battery unit 6 laid out in a space under the floor panel 2. For this reason, the battery unit 6 includes a vibration-resistant, waterproof battery case 62 that is made by aluminum alloy diecasting. This battery case 62 is configured to be divisible into an upper-half portion and a lower-half portion, and the battery modules are accommodated in a rectangular parallelepiped space section that is formed by the upper-half portion and the lower-half portion. The battery module that supplies electricity to the electric motor for driving the vehicle is a battery assembly in a rectangular parallelepiped shape. In the battery assembly, plural battery cells (not illustrated), each of which has a rectangular parallelepiped shape and a standard voltage, are stacked for arrangement. For example, the battery cell is a lithium-ion battery that is one type of a secondary battery.

As illustrated in FIG. 1 and FIG. 2, in plan view, the battery unit 6 is arranged between the 2 cross member 4 and the kick-up section of the floor panel 2 and is constructed of a right and left pair of the split battery units 61 that is respectively arranged on the right and left sides of the tunnel section 23 in a manner to sandwich the tunnel section 23 therebetween. As illustrated in FIG. 4 to FIG. 6, in a side view, each of these paired split battery units 61 is partially superimposed on the floor frame 3 in the up-down direction. The pair of the split battery units 61 has a bilaterally-symmetrical structure. Thus, for convenience of the description, a description will hereinafter collectively be made on one of the split battery units 61 as the battery unit 6 unless otherwise specified.

As illustrated in FIG. 2, the battery unit 6 is attached to the vehicle body via a total of four metallic attachment brackets 71 to 74, two of which are provided on the outer side in the vehicle width direction, and the other two of which are provided on the inner side in the vehicle width direction. The first inner attachment bracket 71 is substantially formed in a box shape. A lower end portion thereof is fastened to an inner front end portion of the battery case 62 via a bolt, and an upper end portion thereof is fastened to the fixed section 24 via a bolt. The second inner attachment bracket 72 is substantially formed in a box shape. A lower end portion thereof is fastened to an inner rear end portion of the battery case 62 via a bolt, and an upper end portion thereof is fastened to the fixed section 26 via a bolt.

As illustrated in FIG. 1 and FIG. 2, the second outer attachment bracket 74 is formed to have a substantially L-shaped cross section. A vertical wall section 74*a* thereof is fastened to the inner rear end portion of the battery case 62 via a bolt, and a horizontal wall section 74*b* thereof is fastened to the opposing wall section 31 via a bolt. As illustrated in FIG. 2 and FIG. 6, the first outer attachment bracket 73 includes a vertical wall section 73*a*, a first horizontal wall section 73*b*, and a second horizontal wall section 73*c*. An outer end portion in the vehicle width direction of the second horizontal wall section 73*c* bulges outward in the vehicle width direction in comparison with this first horizontal wall section 73*b*. This first outer attachment bracket 73 is integrally formed by extruding an aluminum alloy extrusion material to have a plate thickness of 3.0 to 4.7 mm, for example.

The vertical wall section 73*a* is fastened to plural (for example, eight) bolt holes via plural (for example, eight) bolts. The plural bolt holes are integrally formed with ribs in an outer front end portion of the battery case 62. The first horizontal wall section 73*b* extends outward in the vehicle width direction from an upper end portion of the vertical wall section 73*a* and is arranged for surface abutment with a lower surface of the opposing wall section 31. The first horizontal wall section 73*b* is provided with three bolt holes that respectively correspond to the three bolt holes 34 formed in the opposing wall section 31 in the manner to align in the front-rear direction. The bolt 36, which is inserted through each of the bolt holes, is fastened to the nut 37. An outer end portion in the vehicle width direction of the first horizontal wall section 73*b* is arranged to be separated from the vertical wall section of the inner panel 12 by a predetermined distance. In this way, at an initial stage of a lateral collision, it is possible to avoid interference between the inner panel 12 and the first outer attachment bracket 73, and compressive deformation in the vehicle width direction of the opposing wall section 31 is thereby allowed.

The second horizontal wall section 73*c* is formed to be substantially parallel to the first horizontal wall section 73*b* in a horizontal direction. An outer end portion in the vehicle width direction of the second horizontal wall section 73*c* is located outward in the vehicle width direction and downward from the outer end portion in the vehicle width direction of the first horizontal wall section 73*b*. The outer end portion in the vehicle width direction of the second horizontal wall section 73*c* is arranged outward in the vehicle width direction from the vertical wall section of the inner panel 12. In this way, during the lateral collision, the impact load that is applied to a lower portion of the inner panel 12 is transmitted to the opposing wall section 31 via the second horizontal wall section 73*c* and the bolt 36.

In this embodiment, in order to prevent misshaping of the cross section of the floor frame 3, which is caused by resonance between the battery unit 6 and the floor frame 3, the nut plate 8 for reinforcing the closed cross section is installed in the closed cross section of the floor frame 3. Meanwhile, in the case where the rigidity of the floor frame 3 is increased by adopting this nut plate 8, EA performance of the floor frame 3 to absorb the impact load may be degraded. As a result, the battery unit 6 may not be sufficiently protected against the impact load. For this reason, the nut plate 8 is formed with a deformation promoting section that reduces a dimension in the vehicle width direction of the nut plate 8 via the compressive deformation of the opposing wall section 31 when the impact load is applied from the outer side in the vehicle width direction. Here, a definition of the compressive deformation includes bending deformation and the like in addition to accordion deformation, and is deformation behavior in general in which the dimension in the vehicle width direction is reduced in a plan view projection direction before and after the application of the impact load.

As illustrated in FIG. 6 and FIG. 8, the nut plate 8 includes: an opposing wall fixed section 81 in a substantially rectangular shape that is formed to have a substantially U-shaped cross section, is formed with a bolt hole corresponding to the bolt hole 34 at a center, and is superimposed on and fixed to the opposing wall section 31; an outer wall fixed section 82 that is fixed to the outer wall section 32; an inner wall fixed section 83 that is fixed to the inner wall section 33; an intermediate section 88*a* that is separated inward from an outer corner section corresponding to the ridgeline of the floor frame 3 and connects between the opposing wall fixed section 81 and the outer wall fixed section 82; an intermediate section 88*b* that is separated inward from an inner corner section corresponding to the ridgeline of the floor frame 3 and connects between the opposing wall fixed section 81 and the inner wall fixed section 83; and the like. This nut plate 8 is a press-molded product that is made of the steel sheet, and has a plate thickness of 1.8 mm and tensile strength of 270 MPa, for example.

A portion between the opposing wall fixed section 81 and the intermediate section 88*a* is configured to be obtuse and is formed with a bent section 86*a* that extends in the front-rear direction. A portion between the intermediate section 88*a* and the outer wall fixed section 82 is configured to be obtuse and is formed with a bent section 87*a* that extends in the front-rear direction. A portion between the opposing wall fixed section 81 and the intermediate section 88*b* is configured to be obtuse and is formed with a bent section 86*b* that extends in the front-rear direction. A portion between the intermediate section 88*b* and the inner wall fixed section 83 is configured to be obtuse and is formed with a bent section 87*b* that extends in the front-rear direction. As described so far, the bent sections 86*a*, 86*b*, 87*a*, 87*b* correspond to the deformation promoting sections. These bent sections 86*a*, 86*b*, 87*a*, 87*b* cooperate with the two corner sections, which are provided in a bottom section (the opposing wall section 31) of the floor frame 3, to form a right and left pair of space structures, each of which has a substantially triangular cross section.

The two nut plates 8 are provided for attachment of each of the first outer attachment brackets 73. Accordingly, even in the case where the load that is caused by vertical oscillating motion of the battery unit 6, that is, the load that elastically deforms the floor frame 3 is applied to the opposing wall section 31 via the first outer attachment bracket 73 (and the bolt 36) during the steady travel, the opposing wall section 31, the outer wall section 32, the inner wall section 33, and the corner sections of the floor frame 3 are structurally reinforced by a truss structure using the nut plate 8, and misshaping of the cross section of the floor frame 3 is thereby suppressed.

Next, a description will be made of the deformation behavior of the outer portion in the vehicle width direction of the floor frame 3 during the lateral collision with reference to FIG. 9. This deformation behavior is an example of the deformation behavior of the floor frame 3 in this embodiment. Since the opposing wall section 31 is formed with the fragile section (the hole 35*a* and the bead 35*b*), the rigidity of the opposing wall section 31 is set to be lower than that of the outer wall section 32 and the inner wall section 33. Thus, the opposing wall section 31 is configured to be easily deformable during the lateral collision of the vehicle.

In the case where the impact load, that is, such a magnitude of the impact load that plastically deforms the floor frame 3 is applied from the outer side in the vehicle width direction, the compressive deformation occurs such that the dimension in the vehicle width direction of the opposing wall section 31 is reduced by action of the fragile section (the hole 35a and the bead 35b). Then, when the impact load is applied to the nut plate 8 from the lateral side, bending deformation of the nut plate 8 in the front-rear direction is restricted due to formation of the bent sections 86a, 87a, each of which extends in the front-rear direction, and only the bending deformation of the nut plate 8 in the vehicle width direction is allowed.

As illustrated in FIG. 9, when the impact load during the lateral collision is transmitted to the nut plate 8, the bent sections 86a, 87a as the deformation promoting sections orient the opposing wall section 31 neither in the front-rear direction nor the up-down direction but in a deformation direction toward the inner side in the vehicle width direction. The nut plate 8 is deformed inward in the vehicle width direction with the bent sections 86a, 87a as origins of deformation ($\theta 2a<\theta 2$, $\theta 3a<\theta 3$) and induces obtuse deformation of the corner sections of the floor frame 3 ($\theta 1<\theta 1a$). That is, the bent sections 86a, 87a as the deformation promoting sections cause the compressive deformation in which the portion between the lateral wall fixed section 82 and the opposing wall fixed section 81 is reduced in the vehicle width direction in the plan view, and the impact load is absorbed by the deformation of the floor frame 3 and the nut plate 8.

Figure 10:
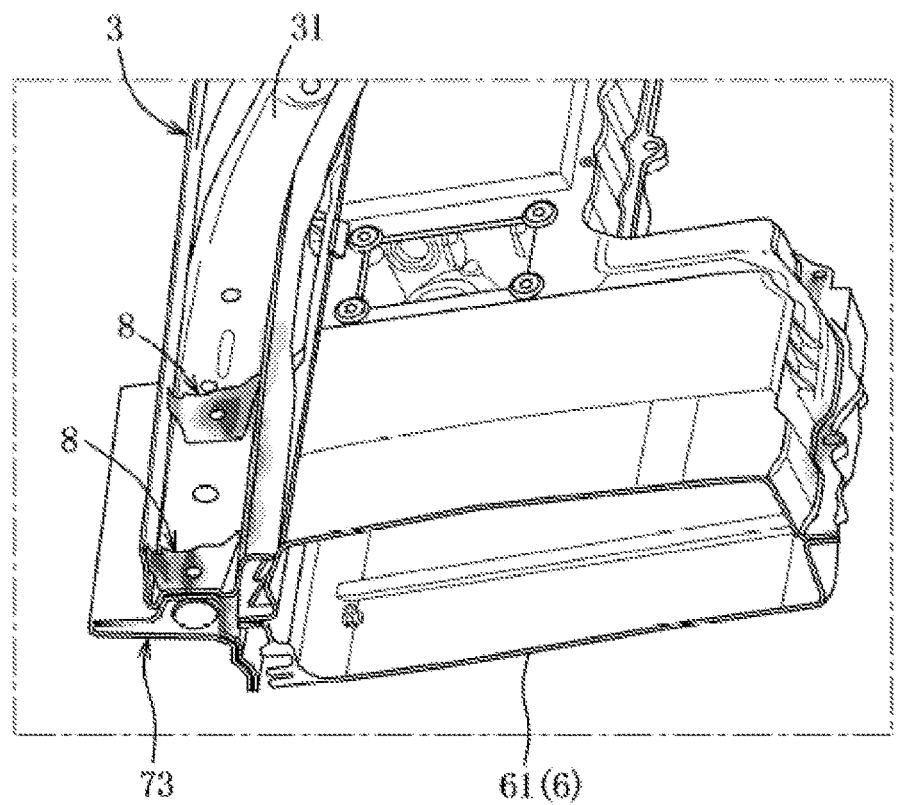
FIG. 10 illustrates a result of a strain analysis during steady travel in the first embodiment.
Figure 11:
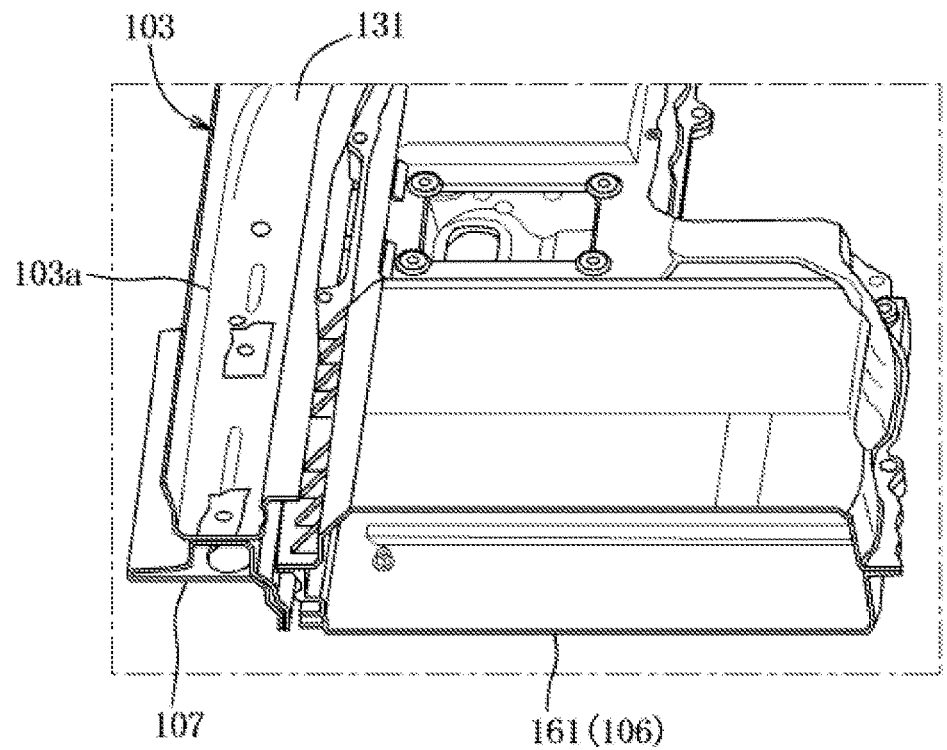
FIG. 11 illustrates an analytical model of a battery unit that is attached to the floor frame.
Figure 12:
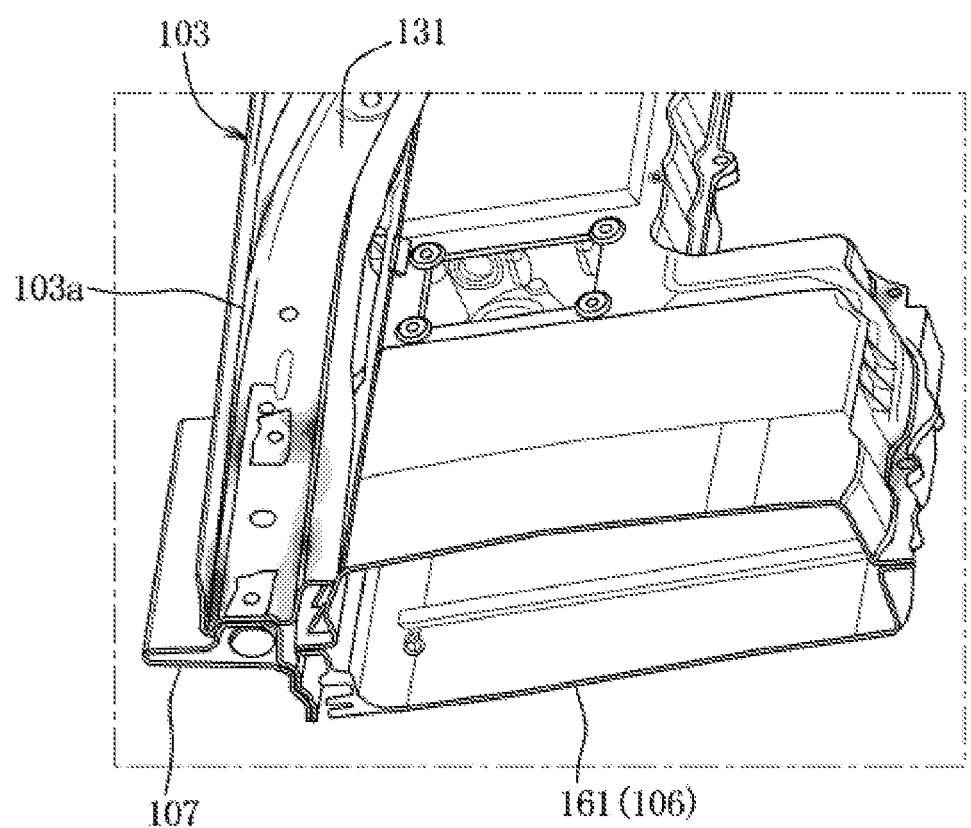
FIG. 12 illustrates a result of a strain analysis during steady travel in the related art.

FIG. 10 illustrates a result of a strain analysis during the steady travel by simulation. As illustrated in FIG. 10, since the floor frame 3 has a deformation promoting section 85 that includes the nut plate 8, compared to a model (see FIG. 12) that does not have the nut plate 8, strain energy indicated by shading is concentrically accumulated on the nut plate 8 (in particular, the bent sections 86a, 86b, 87a, 87b). As a result, it was confirmed that the strain energy did not concentrate on the ridgeline extending in the front-rear direction of the floor frame 3 and that misshaping of the cross section of the floor frame 3 during the steady travel was suppressed.

Next, a description will be made of operational effects of the lower body structure described above. According to the lower body structure in the first embodiment, the floor frame 3 has: the opposing wall section 31 that opposes the lower surface of the floor panel 2; the outer wall section 32 that extends from the outer end portion in the vehicle width direction of the opposing wall section 31 toward the floor panel 2; the inner wall section 33 that extends from the inner end portion in the vehicle width direction of the opposing wall section 31 toward the floor panel 2; the bolt hole 34 that is formed in the opposing wall section 31 and corresponds to the fastening section to which the battery unit 6 is fastened; the hole 35a and the bead 35b configured to reduce the dimension of the opposing wall section 31 in the vehicle width direction via the compressive deformation of the opposing wall section 31 when the impact load is applied from the outer side in the vehicle width direction; and the nut plate 8 that is provided in the closed cross section of the floor frame 3 and reinforces the bolt hole 34. Therefore, it is possible to reduce the rigidity of the opposing wall section 31 in accordance with a request while suppressing misshaping of the cross section of the floor frame 3. The nut plate 8 includes: the lateral wall fixed sections 82, 83 that are respectively fixed to the outer wall section 32 and the inner wall section 33; the opposing wall fixed section 81 that is fixed to the opposing wall section 31; and the bent sections 86a, 86b, 87a, 87b as the deformation promoting sections configured to reduce the dimension in the vehicle width direction of the nut plate 8 via the compressive deformation of the portion between each of the lateral wall fixed sections 82, 83 and the opposing wall fixed section 81 when the impact load is applied from the outer side in the vehicle width direction. Therefore, it is possible to orient the deformation of the opposing wall section 31 toward the vehicle width direction by the folded sections 86a, 86b, 87a, 87b while maintaining the rigidity in the up-down direction of the floor frame 3, and is possible to promote the deformation of the opposing wall section 31 toward the vehicle width direction.

The floor panel 2 is formed with the tunnel section 23 that is provided in the intermediate portion of the vehicle in the vehicle width direction, is projected upward, and extends in the vehicle body front-rear direction. The battery unit 6 is constructed of the pair of the split battery units 61 arranged on both of the sides in the vehicle width direction of the tunnel section 23. Therefore, in the vehicle that includes the tunnel section 23 and in which the vertical behavior of the battery unit 6 is significant, it is possible to simultaneously achieve ride quality performance of the occupant and the EA performance.

Since the deformation promoting section has the bent sections 86a, 86b, 87a, 87b, each of which is formed in the nut plate 8 and extends in the vehicle body front-rear direction, it is possible to form the deformation promoting section, which restricts the deformation direction of the opposing wall section 31, with a simple configuration. The deformation promoting section cooperates with the corner section of the floor frame 3 to form the space section having the substantially triangular cross section. Therefore, it is possible to prevent misshaping of the cross section of the floor frame 3 during the steady travel and to secure the EA performance of the floor frame 3 during the lateral collision with the space structure formed in the floor frame 3.

Since the at least two bolt holes 34, each of which corresponds to the fastening section, are provided to be separated from each other in the front-rear direction in the manner to correspond to the nut plate 8, it is possible to enhance an effect of simultaneously achieving the ride quality performance of the occupant and the EA performance by the at least two bolt holes 34. Since the seat attachment section 51 for a seat on which the occupant is seated is installed between the front nut plate 8 and the rear nut plate 8 in the front-rear direction of the nut plates 8, it is possible to improve the ride quality performance of the occupant even with the seat attachment section 51 that is easily affected by the vertical behavior of the battery unit 6.

The lower end portion of the inner panel 12 is formed to be lower than the opposing wall section 31. The battery unit 6 is fastened to the bolt hole 34 via the first outer attachment bracket 73. The clearance is provided between the inner end portion in the vehicle width direction of the inner panel 12 and the outer end portion in the vehicle width direction of the first horizontal wall section 73b of the first outer attachment bracket 73, so as to allow the deformation of the deformation promoting section 85. Therefore, even in the case where the battery unit 6 is fastened to the bolt hole 34 of the opposing wall section 31 via the first outer attachment bracket 73, it is possible to avoid the deformation of the opposing wall section 31 from being inhibited by the first outer attachment bracket 73 and thus to reliably and simultaneously achieve ride quality performance and EA performance.

Next, a description will be made of modified embodiments in each of which the above embodiment is partially modified:

1) In the above embodiment, a description has been made of an example in which the three bolt holes 34 and the two nut plates 8 for attaching the first outer attachment bracket 73 are provided. However, the same number of the bolt holes 34 and the nut plates 8 may be provided, or the number of the nut plate 8 may be one, three, or more.

2) In the above embodiment, a description has been made of an example in which the hole 35a and the bead 35b are provided as the fragile section is described. However, only one of the hole 35a and the bead 35b may be provided. In addition, as a method for degrading the rigidity of the opposing wall section 31, a thinned structure or a structure formed with plural slits can also be adopted. Alternatively, a material characteristic may partially be changed.

3) In the above embodiment, a description has been made of an example of compressive deformation in which the nut plate 8 is subjected to the bending deformation and the opposing wall section 31 is subjected to the bending deformation. However, any of the nut plate 8 and the opposing wall section 31 may be subjected to the accordion deformation. Alternatively, one of the nut plate 8 and the opposing wall section 31 may be subjected to the accordion deformation while the other thereof is subjected to the bending deformation.

4) In addition to the above, those skilled in the art can implement a mode in which various modifications are added to the embodiment, or a mode in which the embodiments are combined, without departing from the gist of the present disclosure, and the present disclosure includes such modified modes.

What is claimed is:

1. A vehicle lower body structure comprising:
a floor panel that constitutes a floor surface of a vehicle;
a side sill that is coupled to each end portion in a vehicle width direction of the floor panel and extends in a vehicle body front-rear direction;
a floor frame that cooperates with the floor panel to form a closed cross section extending in the vehicle body front-rear direction and is adjacent to an inner side of the side sill in the vehicle width direction; and
a battery unit that is arranged on an inner side of the floor frame in the vehicle width direction and overlaps the floor frame in an up-down direction in a side view, wherein the floor frame has:
an opposing wall section that opposes a lower surface of the floor panel; an outer wall section that extends from an outer end portion of the opposing wall section in the vehicle width direction toward the floor panel;
an inner wall section that extends from an inner end portion of the opposing wall section in the vehicle width direction toward the floor panel;
a fastening section that is formed in the opposing wall section and to which the battery unit is fastened;
a fragile section configured to reduce a dimension of the opposing wall section in the vehicle width direction via compressive deformation of the opposing wall section when an impact load is applied from an outer side of the vehicle in the vehicle width direction; and
a reinforcing member that is provided in the closed cross section and reinforces the fastening section, and the reinforcing member includes:
a lateral wall fixed section that is fixed to the outer wall section and the inner wall section;
an opposing wall fixed section that is fixed to the opposing wall section; and
a deformation promoting section configured to reduce a dimension of the reinforcing member in the vehicle width direction via compressive deformation of a portion of the reinforcing member between the lateral wall fixed section and the opposing wall fixed section when the impact load is applied from the outer side of the vehicle in the vehicle width direction.

2. The vehicle lower body structure according to claim 1, wherein
in an intermediate portion in the vehicle width direction of the vehicle, the floor panel has a tunnel section that is projected upward and extends in the vehicle body front-rear direction, and
the battery unit is constructed of a pair of split battery units that is arranged on both sides in the vehicle width direction of the tunnel section.

3. The vehicle lower body structure according to claim 2, wherein
the deformation promoting section has a bent section that is formed in the reinforcing member and extends in the vehicle body front-rear direction.

4. The vehicle lower body structure according to claim 3, wherein
the deformation promoting section cooperates with a corner section of the floor frame to form a space section having a substantially triangular cross section.

5. The vehicle lower body structure according to claim 4, wherein the fastening section comprises at least two fastening sections which are separated from each other in the vehicle body front-rear direction in a manner to correspond to the reinforcing member.

6. The vehicle lower body structure according to claim 5, wherein the reinforcing member comprises a front reinforcing member and a rear reinforcing member, wherein a seat attachment section for a seat on which an occupant can be seated is installed between the front reinforcing member and the rear reinforcing member in the vehicle body front-rear direction of the reinforcing members.

7. The vehicle lower body structure according to claim 6, wherein
a lower end portion of the side sill is lower than the opposing wall section,
the battery unit is fastened to the fastening section via an attachment bracket, and
a clearance that allows deformation of the deformation promoting section is provided between an inner end portion in the vehicle width direction of the side sill and an outer end portion in the vehicle width direction of the attachment bracket.

8. The vehicle lower body structure according to claim 1, wherein
the deformation promoting section has a bent section that is formed in the reinforcing member and extends in the vehicle body front-rear direction.

9. The vehicle lower body structure according to claim 1, wherein the fastening section comprises at least two fastening sections which are separated from each other in the vehicle body front-rear direction in a manner to correspond to the reinforcing member.

10. The vehicle lower body structure according to claim 1, wherein
a lower end portion of the side sill is lower than the opposing wall section,
the battery unit is fastened to the fastening section via an attachment bracket, and a clearance that allows deformation of the deformation promoting section is provided between an inner end portion in the vehicle width direction of the side sill and an outer end portion in the vehicle width direction of the attachment bracket.

11. The vehicle lower body structure according to claim 8, wherein the deformation promoting section cooperates with a corner section of the floor frame to form a space section having a substantially triangular cross section.

12. The vehicle lower body structure according to claim 9, wherein the reinforcing member comprises a front reinforcing member and a rear reinforcing member, wherein a seat attachment section for a seat on which an occupant can be seated is installed between the front reinforcing member and the rear reinforcing member in the vehicle body front-rear direction of the reinforcing members.

\* \* \* \* \*